(12) United States Patent
Comanzo et al.

(10) Patent No.: US 8,003,012 B2
(45) Date of Patent: Aug. 23, 2011

(54) METHOD FOR PRODUCING A PALETTE OF COLORS FOR PERSISTENT PHOSPHORS AND PHOSPHORS MADE BY SAME

(75) Inventors: Holly Ann Comanzo, Niskayuna, NY (US); Alok Mani Srivastava, Niskayuna, NY (US); William Winder Beers, Chesterland, OH (US); Anant Achyut Setlur, Niskayuna, NY (US); Claire Susan Henderson, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 714 days.

(21) Appl. No.: 12/057,496

(22) Filed: Mar. 28, 2008

(65) Prior Publication Data

US 2008/0179567 A1 Jul. 31, 2008

Related U.S. Application Data

(63) Continuation-in-part of application No. 11/654,191, filed on Jan. 17, 2007, now abandoned.

(51) Int. Cl.
*C09K 11/02* (2006.01)
*C09K 11/64* (2006.01)
*C09K 11/55* (2006.01)

(52) U.S. Cl. ............ 252/301.4 R; 428/690; 252/301.36; 252/301.4 H; 252/301.4 P; 252/301.6 R; 252/301.5; 252/301.4 F; 252/301.6 F (58) Field of Classification Search ............ 252/301.4 R, 252/301.36, 301.4 H, 301.4 P, 301.6 R, 301.5, 252/301.4 F, 301.6 F; 428/690
See application file for complete search history.

(56) References Cited

U.S. PATENT DOCUMENTS

| | | | |
|---|---|---|---|
| 5,874,491 A | 2/1999 | Anders | |
| 5,961,072 A | 10/1999 | Bodle | |
| 6,005,024 A | 12/1999 | Anders et al. | |
| 6,074,739 A | 6/2000 | Katagiri | |
| 6,123,871 A | 9/2000 | Carroll | |
| 6,190,577 B1 | 2/2001 | Hase et al. | |
| 6,276,634 B1 | 8/2001 | Bodie | |
| 6,280,655 B1 | 8/2001 | Xu et al. | |
| 6,375,864 B1 | 4/2002 | Phillips et al. | |
| 6,613,137 B2 | 9/2003 | Egger et al. | |
| 6,692,667 B2 | 2/2004 | Kyeng-Jung | |
| 6,696,126 B1 | 2/2004 | Fischer et al. | |
| 6,809,471 B2 | 10/2004 | Setlur et al. | |
| 6,911,159 B2 | 6/2005 | Rogers et al. | |
| 6,969,475 B2 | 11/2005 | Hyland, Jr. et al. | |
| 7,024,781 B1 | 4/2006 | Cowie | |
| 2005/0212397 A1 | 9/2005 | Murazaki et al. | |
| 2009/0152497 A1* | 6/2009 | Comanzo et al. | 252/301.6 R |

* cited by examiner

*Primary Examiner* — C. Melissa Koslow
(74) *Attorney, Agent, or Firm* — Mary Louise Gioeni (57) ABSTRACT

The current invention provides a persistent phosphor blend, along with techniques for making and using the blend. The persistent phosphor blend is made of at least one persistent phosphor combined with at least one other phosphor, where the excitation spectra of the one or more other phosphors overlap the emission spectra of the one or more persistent phosphors. The choice of the phosphors used allows the decay time and emission colors to be tuned for the specific application. In another embodiment, the invention provides a method for making persistent phosphor blends with tunable colors. In yet another embodiment, applications for such a persistent phosphor blend are provided.

20 Claims, 6 Drawing Sheets

FIG. 13

METHOD FOR PRODUCING A PALETTE OF COLORS FOR PERSISTENT PHOSPHORS AND PHOSPHORS MADE BY SAME

CROSS-REFERENCE TO RELATED APPLICATIONS

This application is a continuation in part of U.S. patent application Ser. No. 11/654,191, filed 17 Jan. 2007, now abandoned, which is herein incorporated by reference.

BACKGROUND

The current invention relates generally to phosphor blends having long persistence and tunable colors. More specifically, the current invention provides blends of one or more persistent phosphors with one or more other phosphors to create blends with long persistence and tunable colors.

A phosphor is a luminescent material that absorbs radiation energy in one portion of the electromagnetic spectrum and emits energy in another portion of the electromagnetic spectrum. One important class of phosphors includes crystalline inorganic compounds of very high chemical purity and of controlled composition, to which small quantities of other elements, called "activators," have been added for fluorescent emission. With the right combination of activators and inorganic compounds, the color of the emission of these crystalline phosphors can be controlled. Most useful phosphors emit radiation in the visible portion of the electromagnetic spectrum in response to excitation by electromagnetic energy outside the visible range. Well known phosphors have been used in mercury vapor discharge lamps to convert the ultraviolet (UV) radiation emitted by the excited mercury to visible light. Other phosphors are capable of emitting visible light upon being excited by electrons, useful in photomultiplier tubes, or X-rays, such as scintillators used in imaging systems.

One important property of phosphors is the decay time, or the time required for the phosphor to stop emitting light after the excitation is removed. Most phosphor compositions have short decay times, with most of the stored energy emitted as light within seconds, or even a small fraction of a second, after excitation ends. Although their decay time is short, these phosphors have many possible color choices and multiple phosphor blends may be made with specific colors for use in lighting applications where continuous excitation is present.

New persistent phosphorescent materials have been developed in an attempt to extend the decay time for applications when continuous excitation is not present. However, many of these persistent phosphors have emission spectra that peak in the blue or green spectral regions, which may limit their visibility in certain applications. Accordingly, there is a need for new phosphorescent compositions that have long decay times and emission spectra that may be tuned for the application.

BRIEF DESCRIPTION

In one embodiment, the current invention provides a persistent phosphor blend, which has at least one persistent phosphor blended with at least one other phosphor, wherein the emission spectrum of the at least one persistent phosphor at least partially overlaps the excitation spectrum of the at least one other phosphor. The at least one persistent phosphor comprises a composition selected from the group consisting of a) a composition having a general formula $A_{x-y-z}Al_{2-m-n-o-p}O_4$:$Eu_y$, $Dy_z$, $B_m$, $Zn_n$, $CO_o$, $Sc_p$, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula $A_{x-y-z}Al_{2-m-n-o-p}O_4$:$Eu_y$, $Nd_z$, $B_m$, $Zn_n$, $CO_o$, $Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05.

Another embodiment provides a method of producing a persistent phosphor blend with tunable colors. The method comprises blending the at least one persistent phosphor as described above with at least one other phosphor, wherein the emission spectrum of the least one persistent phosphor at least partially overlaps the excitation spectrum of the at least one other phosphor.

Another embodiment provides an article of manufacture containing a persistent phosphor blend. The article of manufacture comprises a structure and a phosphor blend that has at least one persistent phosphor as described above and at least one other phosphor, wherein the emission spectrum of the at least one persistent phosphor at least partially overlaps the excitation spectrum of the at least one other phosphor in the composition.

Another embodiment provides an article of manufacture coated with layers containing at least one persistent phosphor as described above and at least one other phosphor. The emission spectrum of the at least one persistent phosphor at least partially overlaps the excitation spectrum of the at least one other phosphor.

Yet another embodiment provides a coating comprising one or more layers, the coating containing at least one persistent phosphor as described above and at least one other phosphor, wherein the emission spectra of the at least one persistent phosphor partially overlaps the emission spectra of the at least one other phosphor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
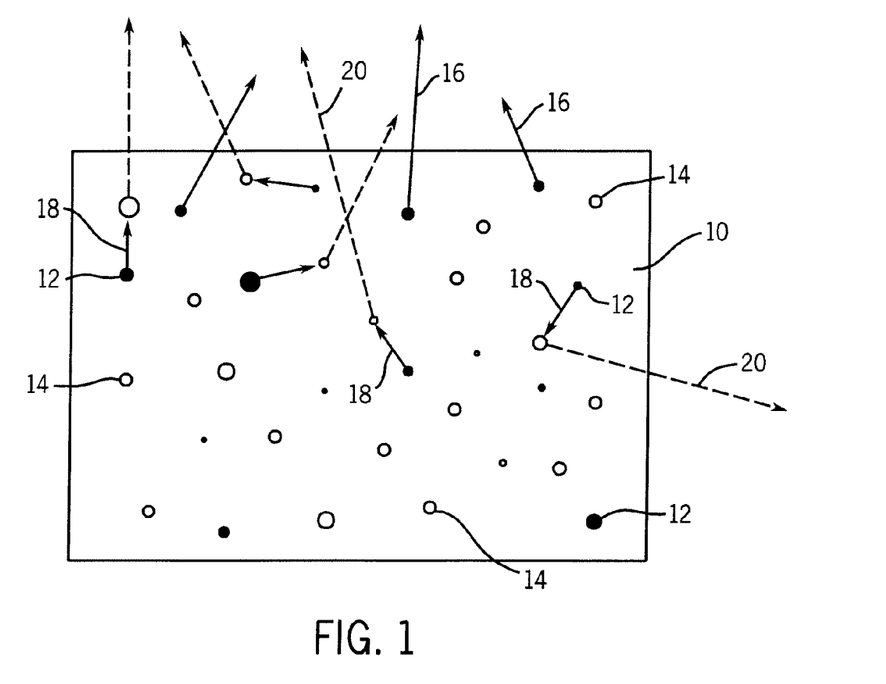
FIG. 1 is a diagrammatical representation of a structure impregnated with particles of two different phosphor materials, a persistent phosphor and another phosphor, in accordance with embodiments of the current invention.

FIG. 1 shows a matrix 10 containing a blend of two types of phosphors: a persistent phosphor 12, and another phosphor 14, in accordance with embodiments of the current invention. In this illustration, the excitation has ended, and the persistent phosphor 12 particles are emitting stored energy as photons. These photons may escape the matrix 10, as indicated generally by reference numeral 16, and be visible as a blue or green luminescence. Alternatively, the emitted photons may be absorbed by particles of another phosphor 14, as represented by reference numeral 18, which then release the captured energy as longer wavelength photons 20. The visible combination of the two types of photons 16, 20 emitted from the matrix 10 results in a different color for the luminescence from the persistent phosphor blend, as compared to the luminescence from the persistent phosphor by itself. For example, if the longer wavelength photons 20 are yellow and the shorter wavelength photons 16 are blue, the overall structure may appear to have a white luminescence. Those skilled in the art will recognize that the phosphor blend is not limited to one persistent phosphor 12 and one other phosphor 14. Indeed, the blend may comprise two or more persistent phosphors in combination with two or more other phosphors, depending on the desired persistence time and emission color. In this embodiment of the current invention, the phosphor powders are blended prior to incorporation into a plastic matrix. In other embodiments, each phosphor may be separately incorporated into the matrix to form a final composition containing a phosphor blend. Those skilled in the art will recognize that the matrix is not limited to plastic, but may also encompass other materials such as paint, glass, or other organic or inorganic matrices, including such materials as transparent ceramics.

The phosphor blend may be made by any suitable mechanical method. In exemplary embodiments, such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders.

Figure 2:
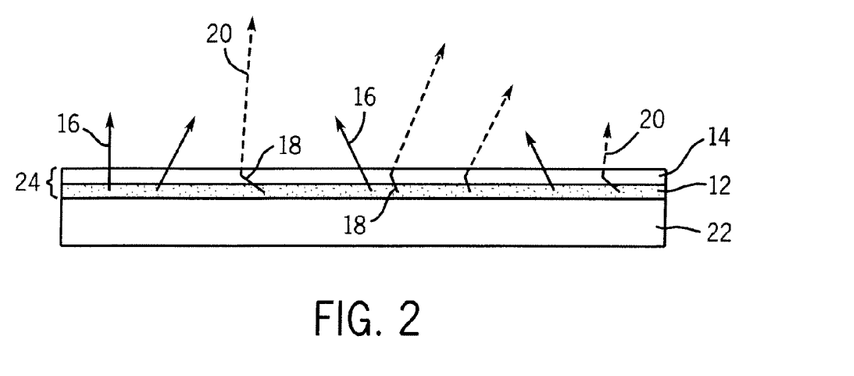
FIG. 2 is a diagrammatical representation of a layered structure containing different phosphors in the different layers, including a persistent phosphor and another phosphor, in accordance with embodiments of the current invention.

FIG. 2 shows an alternate configuration for a multiple phosphor structure, in accordance with embodiments of the current invention. In FIG. 2, a substrate 22 is coated with layers 24 containing a persistent phosphor 12, and another phosphor 14. After the excitation is removed, photons emitted from the persistent phosphor 12 may escape, as indicated by reference numeral 16, and be visible as a blue or green luminescence. Alternatively, the photons emitted from the persistent phosphor 12 may be absorbed by the other phosphor 14, which then emits the absorbed energy as longer wavelength photons 20. As discussed with respect to FIG. 1, if the short wavelength photons 16 are blue and the longer wavelength photons 20 are yellow, the overall structure will appear to have a white luminescence. Furthermore, those skilled in the art will recognize that this structure may have more than one layer containing a persistent phosphor 12, and more then one layer containing another phosphor 14. The ordering of the layers may be controlled to tune the appearance of the emission.

In either of the embodiments discussed with respect to FIGS. 1 and 2, incorporation of the phosphors into a matrix 10 or layers 23 may be implemented using standard processing techniques for the matrix material chosen. For example, in embodiments of the current invention, the phosphors could be incorporated into a paint composition by mixing a powder blend into the base paint mixture, as if the phosphors were a dry pigment. In other embodiments, the phosphors could be stirred into a solvent to form a slurry prior to incorporation in the base paint mixture.

If the matrix is a polymer, incorporation of the phosphors may be done using such techniques as powder blending, compression molding, injection molding, sheet forming, film blowing, fiber forming, or any other plastics processing technique that may incorporate a dry powder blend into a plastic matrix. Those skilled in the art will recognize that the plastic matrix material used in embodiments of the current invention may be any thermoplastic material with sufficient translucency to allow light transfer through thin layers, including, but not limited to, polystyrene, high impact polystyrene (HIPS), styrene-butadiene copolymer, polycarbonate, polyethylene, polyurethane, polyethylene terephthalate (PET), polyethylene terephthalate glycol (PETG), and polypropylene, among others. Furthermore, the plastic matrix may also be a thermo-set material, including, but not limited to, silicone RTV resins, epoxy resins, polyesters, phenol-formaldehyde resins, and melamine, among others. In exemplary embodiments, the phosphors are incorporated into thermo-set resins by mixing the phosphor with one of the two reactant portions.

Figure 3:
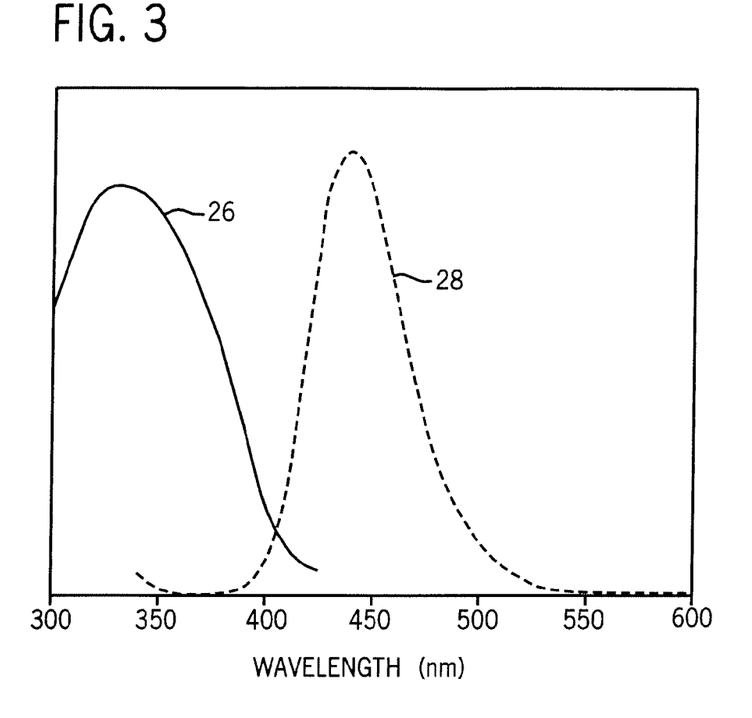
FIG. 3 is a graphical representation of exemplary excitation and emission spectra for a persistent phosphor, which may be used in embodiments of the current invention.

In order for energy to be transferred from the persistent phosphor 12 to the other phosphor 14, the emission spectrum of the persistent phosphor 12 must have some overlap with the excitation spectrum of the other phosphor 14. To illustrate this point, FIGS. 3-7 show the excitation and emission spectra of phosphors that may be used in embodiments of the current invention. For example, FIG. 3 shows the excitation 26 and emission 28 spectra for an exemplary persistent phosphor, $Ca_{0.90}Eu_{0.005}Nd_{0.03}Al_2O_4$, used in embodiments of the current invention. The emission spectrum 28 has a maximum intensity at about 450 nm, with some intensity in the range of about 400 nm to about 550 nm. This emission intensity can be compared to the excitation, or absorbance, spectra for other exemplary phosphors that may be used in embodiments of the current invention, as represented by the solid lines in the spectra shown in FIGS. 4-7.

Figure 4:
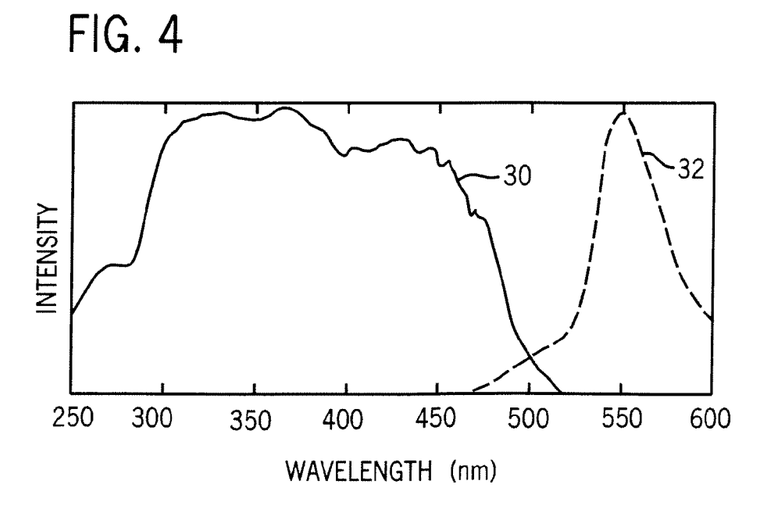
FIG. 4 is a similar graphical representation of exemplary excitation and emission spectra of a phosphor, $(Ca,Sr)_8(Mg,Zn)(SiO_4)_4Cl_2$:$Eu^{2+}$, $Mn^{2+}$ (CaSi), which may be used in embodiments of the current invention.
Figure 5:
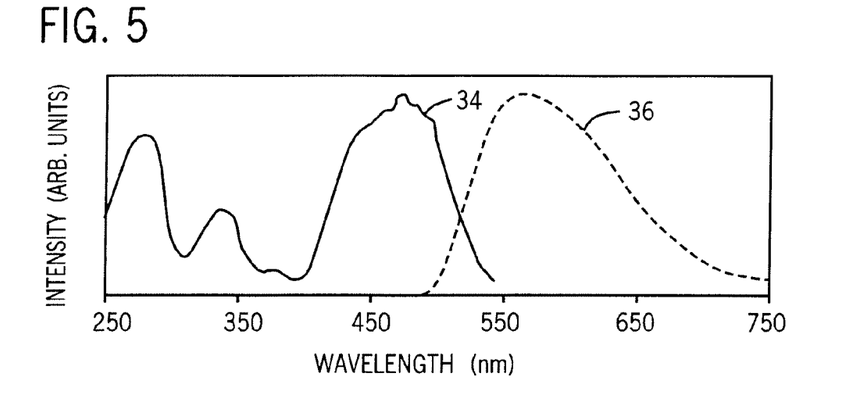
FIG. 5 is a graphical representation of exemplary excitation and emission spectra of another phosphor, $Tb_3A_{4.9}O_{12}$:$Ce^{3+}$ (TAG:Ce), which may be used in embodiments of the current invention.

FIGS. 4 and 5 show the excitation and emission spectra for phosphors that have a strong absorbance around 450 nm. FIG. 4 shows the excitation and emission spectra, 30 and 32, respectively, of the phosphor $(Ca,Sr)_8(Mg,Zn)(SiO_4)_4Cl_2$:$Eu^{2+},Mn^{2+}$ (CASI), which may be used in exemplary embodiments of the current invention. FIG. 5 shows the excitation and emission spectra, 34 and 36, respectively, of the phosphor $(Tb,Y,Lu,La,Gd)_3(Al,Ga)_5O_{12}$:$Ce^{3+}$ (TAG:Ce), which may be used in exemplary embodiments of the current invention. The high degree of overlap between the excitation spectra 30, 34 of these phosphors with the emission spectrum 28 of the exemplary persistent phosphor, discussed with respect to FIG. 3, indicates that efficient energy transfer would occur, and a significant portion of the light emitted may come from the CASI or TAG:Ce in blends with the persistent phosphor.

Figure 6:
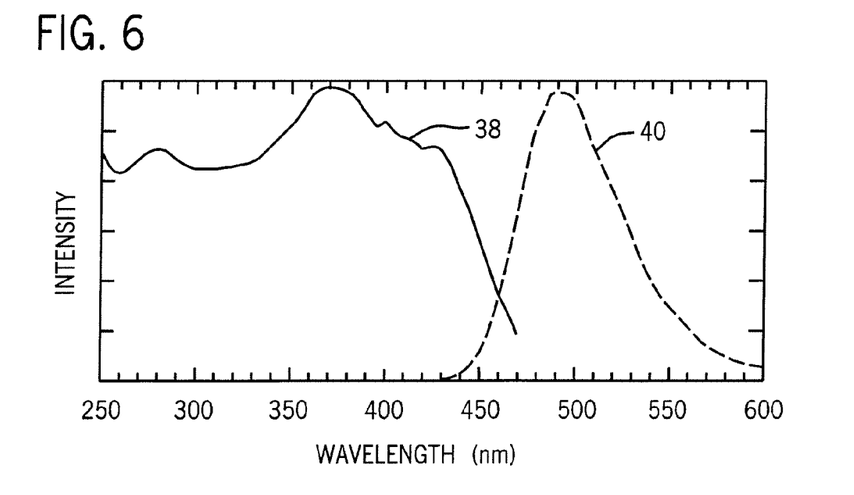
FIG. 6 is a graphical representation of exemplary excitation and emission spectra of another phosphor, $Sr_4Al_{14}O_{25}$:$Eu^{2+}$ (SAE), which may be used in embodiments of the current invention.
Figure 7:
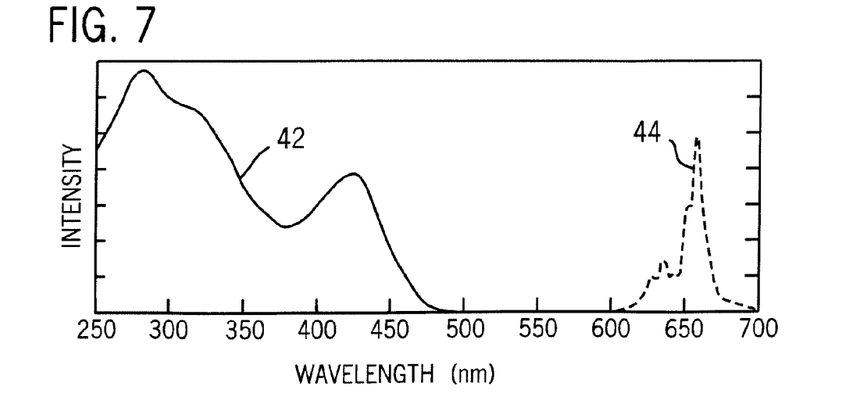
FIG. 7 is a graphical representation of exemplary excitation and emission spectra of another phosphor, $3.5MgO*0.5MgF_2*GeO_2$:$Mn^{4+}$ (MFG), which may be used in embodiments of the current invention.

In contrast to the strong overlap between the spectra described above, FIGS. 6 and 7 show the excitation and emission spectra for phosphors that have a weaker absorbance around 450 nm. FIG. 6 shows the excitation and emission spectra, 38 and 40, respectively, of the phosphor $Sr_4Al_{14}O_{25}$:$Eu^{2+}$ (SAE), which may be used in exemplary embodiments of the current invention. FIG. 7 shows the excitation and emission spectra, 42 and 44, respectively, of the phosphor $3.5MgO$-$0.5MgF_2$—$GeO_2$:$Mn^{4+}$ (MFG), which may be used in exemplary embodiments of the current invention. The absorbance of these phosphors at 450 nm is lower than that discussed with respect to FIGS. 4 and 5, with most of the absorbance at shorter wavelengths, as shown in the excitation spectra 38, 42. This indicates that the efficiency of the energy transfer from the emission 28 of the exemplary persistent phosphor, discussed with respect to FIG. 3, may be somewhat lower. However, the existence of some overlap between the emission spectrum 28 and the excitation spectra 38, 42 indicates that they may absorb at least a portion of the photons 18 emitted by the persistent phosphor 12 and emit longer wavelength photons 16, changing the perceived color of the blend.

As these examples illustrate, it is not necessary for the emission spectrum of the persistent phosphor to perfectly match the excitation spectrum of the other phosphor. Any energy emitted by the persistent phosphor 12 that is not absorbed by the other phosphor 14 will be emitted from the structure, and become part of the visible light mixture perceived by the viewer.

In embodiments of the current invention, the persistent phosphor may have the general formula $A_{x-y-z}Al_2O_4$:$Eu_y$, $Nd_z$, where A may be Ba, Sr, Ca, or a combination of these metals, x is between about 0.75 and 1.3, y is between about 0.0005 and 0.1, and z is between about 0.0005 and 0.1. In other embodiments of the current invention, the persistent phosphor may have the general formula $A_{x-y-z}Al_2O_4$:$Eu_y$, $Dy_z$, where A may be Sr, Ca, Ba, or a combination of these metals, x is between about 0.75 and 1.3, y is between about 0.0005 and 0.1, and z is between about 0.0005 and 0.1. The persistent phosphor compositions shown above are merely examples of phosphors that may be used in embodiments, and are not intended to be limiting. Those skilled in the art will recognize that other persistent phosphor compositions may be used while remaining within the scope of the current invention.

In certain embodiments of the present invention, the persistent phosphor 12 comprises a phosphor as described in U.S. patent application Ser. No. 11/954,814, herein incorporated by reference in its entirety. For example, one phosphor suitable for use in the persistent phosphor 12 has the general formula $A_{x-y-z}Al_{2-m-n-o-p}O_4$:$Eu_y$, $Dy_z$, $B_m$, $Zn_n$, $Co_o$, $Sc_p$ where A may be Ba, Sr, Ca, or a combination of these elements, x is between about 0.75 and 1.3, y is between about 0.0005 and 0.1, and z is between about 0.0005 and 0.1. Further m is between about 0.0005 and 0.30, n is between about 0.0005 and 0.10, o is between about 0 and 0.01 and p is between about 0 and 0.05. Phosphors made according to this formulation may have a green luminescence and a longer persistence than other types of phosphors.

Alternately, a phosphor suitable for use in the persistent phosphor 12 has the general formula $A_{x-y-z}Al_{2-m-n-o-p}O_4$:$Eu_y$, $Nd_z$, $B_m$, $Zn_n$, $Co_o$, $Sc_p$ where A may be Ba, Sr, Ca, or a combination of these elements, x is between about 0.75 and 1.3, y is between about 0.0005 and 0.1, and z is between about 0.0005 and 0.1. Further m is between about 0.0005 and 0.30, n is between about 0.0005 and 0.10, o is between about 0 and 0.01, and p is between about 0 and 0.05. Phosphors made according to this formulation may have a blue luminescence and a longer persistence than other types of phosphors.

For the purposes of describing the compositions above and throughout this description, the term "between" when describing a numerical range shall be interpreted mean a range that is inclusive of the described endpoints.

In embodiments of the current invention, the other phosphor 14 may be a blue emitter, a blue-green emitter, a green emitter, a yellow emitter, a yellow-orange emitter, an orange-red emitter, a red emitter, or a blend of phosphors having these emission colors, depending on the final color and persistence properties desired. In such embodiments, the one or more other phosphors chosen may have the general formulas: $(Ca,Sr)_8(Mg,Zn)(SiO_4)_4Cl_2$:$Eu^{2+},Mn^{2+}$ (CASI); $(Tb,Y,Lu,La,Gd)_3(Al,Ga)_5O_{12}$:$Ce^{3+}$ (TAG:Ce); $Sr_4Al_{14}O_{25}$:$Eu^{2+}$ (SAE); $3.5MgO$-$0.5MgF_2$—$GeO_2$:$Mn^+$ (MFG); $(Ba,Sr,Ca)_5(PO_4)_3(Cl,F,OH)$:$Eu^{2+}$; $(Ba,Sr,Ca)MgAl_{10}O_{17}$:$Eu^{2+}$; $(Ba,Sr,Ca)BPO_5$:$Eu^{2+}$; $Sr_4Al_{14}O_{25}$:$Eu^{2+}$; $BaAl_8O_{13}$:$Eu^{2+}$; $2SrO$·$0.84P_2O_5$·$0.16B_2O_3$:$Eu^{2+}$; $MgWO_4$; $BaTiP_2O_8$; $(Ba,Sr,Ca)MgAl_{10}O_{17}$:$Eu^{2+},Mn^{2+}$; $(Ba,Sr,Ca)_5(PO_4)_3(Cl,F,OH)$:$Sb^{3+}$; $LaPO_4$:$Ce^{3+},Tb^{3+}$; $CeMgAl_{11}O_{19}$:$Tb^{3+}$; $GdMgB_5O_{10}Ce^{3+},Tb^{3+},Mn^{3+}$; $GdMgB_5O_{10}$:$Ce^{3+},Tb^{3+}$; $(Ba,Sr,Ca)_5(PO_4)_3(Cl,F,OH)$:$Eu^{2+},Mn^{2+},Sb^{3+}$; $(Y,Gd,La,Lu,Sc)_2O_3$:$Eu^{3+}$; $(Y,Gd,La,In,Lu,Sc)BO_3$:$Eu^{3+}$; $(Y,Gd,La)(Al,Ga)O_3$:$Eu^{3+}$; $(Ba,Sr,Ca)(Y,Gd,La,Lu)_2O_4$:$Eu^{3+}$; $(Y,Gd)Al_3B_4O_{12}$:$Eu^{3+}$; monoclinic $Gd_2O_3$:$Eu^{3+}$; $(Gd,Y)_4(Al,Ga)_2O_9$:$Eu^{3+}$; $(Ca,Sr)(Gd,Y)_3(Ge,Si)Al_3O_9$:$Eu^{3+}$; $(Sr,Mg)_3(PO_4)_2$:$Sn^{2+}$; $GdMgB_5O_{10}Ce^{3+},Mn^{2+}$ Those skilled in the art will recognize that the current invention is not limited to the phosphor compositions disclosed above and that other phosphors may be used, while remaining within the scope of the current invention.

The phosphors used in the current invention may be produced by mixing powders of oxygen-containing compounds of the relevant metals, and then firing the mixture under a reducing atmosphere. For example, the persistent phosphor: $Ca_{0.90}Eu_{0.005}Nd_{0.03}Al_2O_4$, used in exemplary embodiments of the current invention, may be produced by mixing powders of oxygen-containing compounds of europium, neodymium, an alkaline-earth metal, and a group 13 metal, and then firing the mixture under a reducing atmosphere. After firing, the phosphor may be ball milled, or otherwise ground, to break up any conglomerates that may have formed during the firing procedure.

In exemplary embodiments, the oxygen-containing compounds may be oxides, carbonates, nitrates, sulfates, phosphates, citrates, carboxylates, and combinations of these compounds. In embodiments containing carboxylates, the carboxylates used may have from one to five carbon atoms, such as formates, ethanoates, proprionates, butyrates, and pentanoates.

In other embodiments, the mixture of starting materials for producing the phosphor also comprises a flux, such as boric acid, lithium tetraborate, lithium carbonate, hydrogen borate, an alkali hydroborate, or a mixture of these compounds. According to another embodiment of the present invention, the flux may be a halide compound, such as a fluoride, of europium, neodymium, the alkaline-earth metals, or the group 13 metals. The halide compound can comprise up to 10 percent, by weight, of the mixture. The flux may also be an alkali halide, such as lithium fluoride, sodium fluoride, or other alkali halides. In embodiments containing a flux, it may be desirable to wash the product with hot water to remove residual soluble impurities originating from the flux.

The oxygen containing compounds may be mixed together by any mechanical method. In exemplary embodiments, such methods may include stirring or blending the powders in a high speed blender or a ribbon blender, or combining and pulverizing the powders in a bowl mill, hammer mill, or jet mill. Those skilled in the art will recognize that any number of other techniques may be used to make a well blended mixture of powders. If the mixture is wet, it may be dried first before being fired. The drying may be carried out at ambient atmosphere or under a vacuum.

The mixture of oxide powders is fired in a reducing atmosphere at a temperature in a range from about 900° C. to about 1,700° C. for a time sufficient to convert the mixture to the phosphor. In exemplary embodiments the temperature may be in the range from about 1,000° C. to about 1,400° C. The firing may be conducted in a batch or continuous process, preferably with stirring or mixing to promote good gas-solid contact. The firing time required may range from about one minute to ten hours, depending on the amount of the oxide mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 10° C./minute to about 200° C./minute. In exemplary embodiments, the temperature is raised to the final temperature at rates of about 10° C./minute to about 100° C./minute. Those skilled in the art will recognize that the precise conditions needed for the synthesis of a particular phosphor composition will depend on the phosphor chosen and are within the ambit of the conditions above.

The firing is performed under a reducing atmosphere, which may include such compounds as hydrogen, carbon monoxide, ammonia, hydrazine, or a mixture of these compounds with an inert gas such as nitrogen, helium, argon, krypton, xenon. In one embodiment, a mixture of hydrogen and nitrogen containing hydrogen in an amount from about 0.5 volume percent to about 10 volume percent may be used as a reducing gas. In another embodiment, the reducing gas may be carbon monoxide, generated in situ in the firing chamber by the reaction between residual oxygen and carbon particles placed in the firing chamber. In yet another embodiment, the reducing atmosphere is generated by the decomposition of ammonia or hydrazine. In exemplary embodiments, after firing, the phosphor may be ball milled in a propanol slurry to break up aggregates that may have formed during firing.

In addition to the synthesis procedures discussed above, many of the phosphors that may be used in embodiments of the current invention may be commercially available. For example, both of the phosphors $Sr_4Al_{14}O_{25}$:$Eu^{2+}$ (SAE) and 3.5MgO-0.5MgF$_2$—GeO$_2$:Mn$^{4+}$ (MFG), used in embodiments of the current invention, are commercially available.

Figure 8:
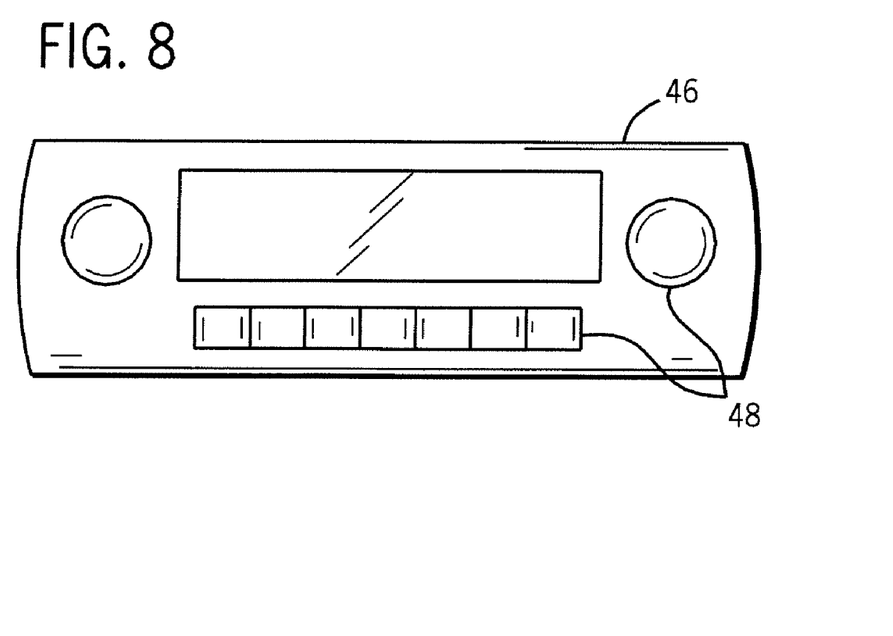
FIG. 8 is an elevational view of an exemplary product that may incorporate a phosphor blend in accordance with the invention, in this case a faceplate panel of an automobile radio, with either the faceplate or controls containing a persistent phosphor blend in accordance with embodiments of the present invention.
Figure 9:
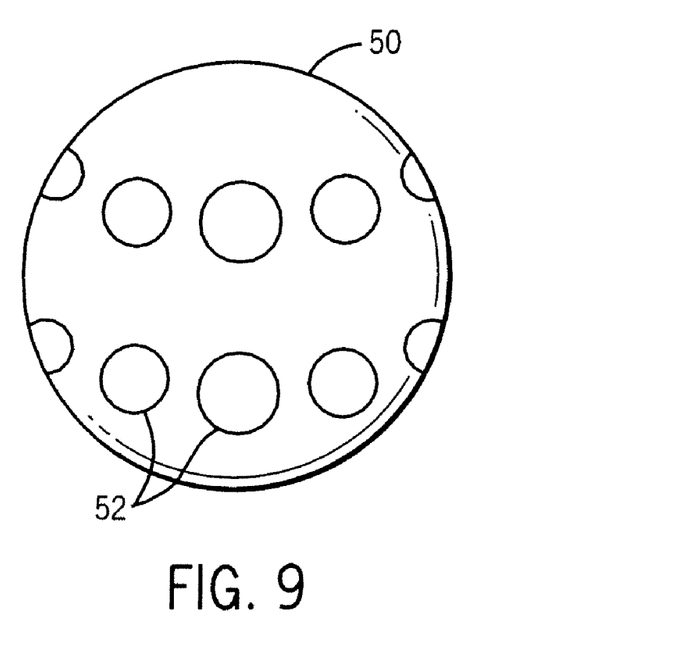
FIG. 9 illustrates another exemplary application, in this case a child's toy containing a persistent phosphor blend or decorated with a film containing a persistent phosphor blend in accordance with embodiments of the present invention.

Using the techniques discussed with regard to FIGS. 1 and 2, the phosphor blends of the current invention may be incorporated into numerous products for use in low light applications, including safety equipment, toys, input devices, signs, emergency exit indicators, instrument panel controls, electrical switches, circuit breaker switches, furniture, communication devices, wristwatch faces, numbers on a wristwatch face, clock faces, numbers on a clock face, kitchen ware, utensils, labels, car dashboard controls, stair treads, clothing, lamps, weapon sights, and displays. For example, FIG. 8 shows the front faceplate 46 of a car radio with controls 48. In embodiments of the current invention, a phosphor blend may either be incorporated in the faceplate 46 or in the controls 48. FIG. 9 shows a child's toy 50 with various decorations 52 attached to the outside. A phosphor blend may be incorporated into the structure of the toy 50 or into the decorations 52, in accordance with embodiments of the current invention.

Figure 10:
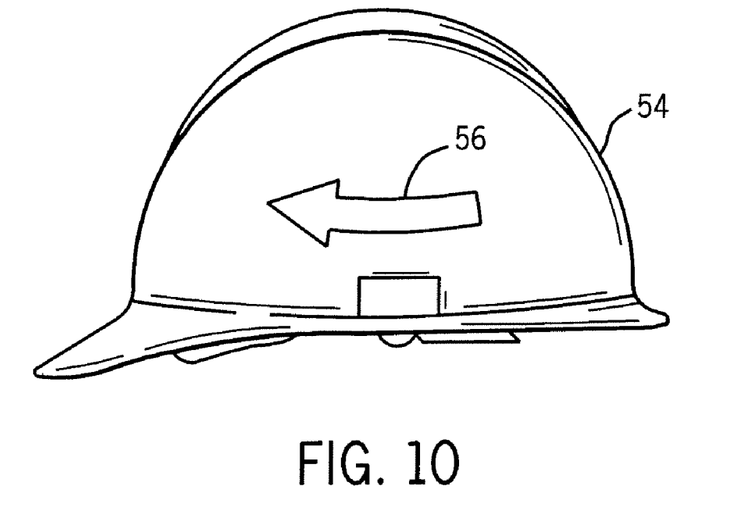
FIG. 10 illustrates a hard hat either containing a persistent phosphor blend or decorated with a film containing a persistent phosphor blend, in accordance with embodiments of the present invention.
Figure 11:
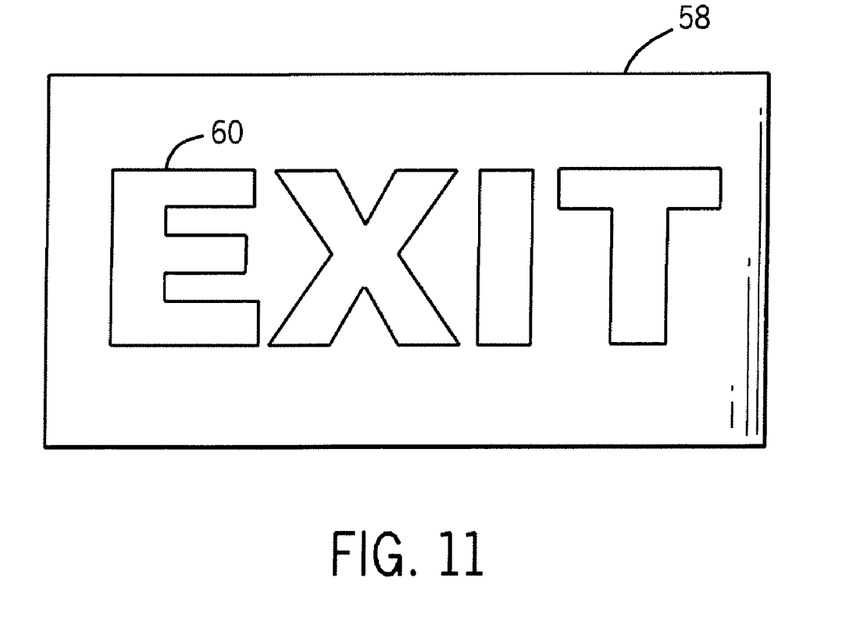
FIG. 11 shows an exit sign containing a persistent phosphor blend, in accordance with embodiments of the present invention.
Figure 12:
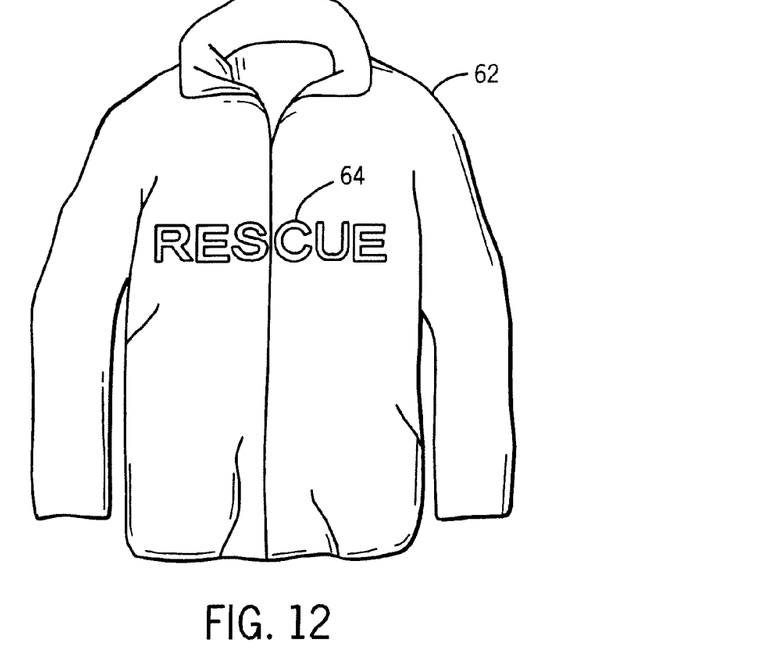
FIG. 12 shows an article of clothing either containing a persistent phosphor blend in the material itself, or letters attached to the front of the article of clothing containing a persistent phosphor blend, in accordance with embodiments of the present invention.
Figure 13:
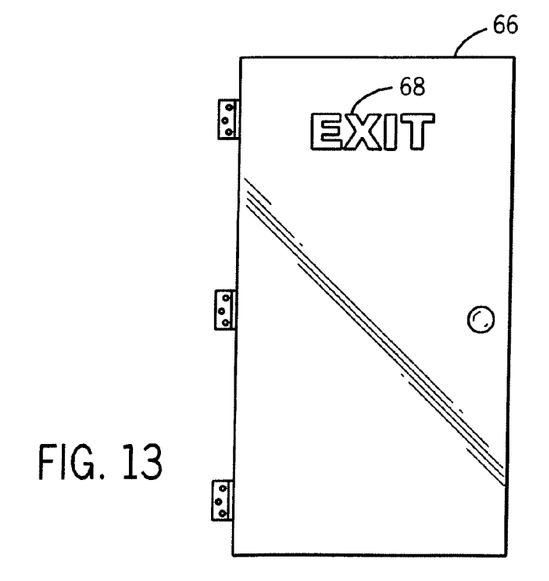
FIG. 13 is a door, with an attached "EXIT" sign containing a persistent phosphor blend, in accordance with embodiments of the present invention.

Furthermore, the long persistence and tunable color of the phosphor blends of the current invention make them useful for applications in emergency equipment. For example, FIG. 10 shows a hard hat 54 with stickers 56 attached to the outside. In embodiments of the current invention, a phosphor blend may be incorporated into the body of the hard hat 54 or into the stickers 56. FIG. 11 shows an emergency exit sign 58 with applied lettering 60. In embodiments of the current invention, a phosphor blend may be incorporated into the sign 58 or into the lettering 60. FIG. 12 illustrates an article of clothing 62 with letters 64 attached to the front. A phosphor blend may be incorporated either into the fabric of the article of clothing 62 or into the lettering 64, in accordance with embodiments of the current invention. In FIG. 13, a door 66 has attached letters 68, spelling the word "EXIT" in this example. In embodiments of the current invention, the lettering 68 may incorporate a phosphor blend. The letters may also be colored, so as to be visible at all times, or clear, so as to be visible only in low light conditions, when the glow from the phosphor blend can be seen.

The applications above are but a few examples of embodiments of the present invention and are not intended to limit its application to those uses. Those skilled in the art will recognize that a long lived persistent phosphor can be used in a large variety of applications beyond the ones listed above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A persistent phosphor blend comprising:
   at least one persistent phosphor comprising a composition selected from the group consisting of
   a) a composition having a general formula $A_{x-y-z}Al_{2-m-n-o-p}O_4$:$Eu_y$, $Dy_z$, $B_m$, $Zn_n$, $Co_o$, $Sc_p$, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula $A_{x-y-z}Al_{2-m-n-o-p}O_4:Eu_y, Nd_z, B_m, Zn_n, Co_o, Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05; and at least one other phosphor, wherein the excitation spectrum of the at least one other phosphor partially overlaps the emission spectrum of the persistent phosphor.

2. The persistent phosphor blend according to claim 1, wherein the at least one other phosphor is selected from the group consisting of blue emitters, blue-green emitters, green emitters, yellow emitters, yellow-orange emitters, orange-red emitters, red emitters, and combinations thereof.

3. The persistent phosphor blend according to claim 1 wherein the at least one other phosphor has a general formula selected from the group consisting of $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $LaPO_4:Ce^{3+},Tb^{3+}$; $CeMgAl_{11}O_{19}:Tb^{3+}$; $GdMgB_5O_{10}:Ce^{3+},Tb^{3+},Mn^{2+}$; $GdMgB_5O_{10}:Ce^{3+},Tb^{3+}$; $(Tb,Y,Lu,La,Gd)_3(Al,Ga)_5O_{12}:Ce^{3+}$; $(Ba,Sr,Ca)_5(PO_4)_3(Cl,F,OH):Eu^{2+},Mn^{2+},Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+},Mn^{2+}$; $3.5MgO-0.5MgF_2—GeO_2:Mn^{4+}$; and combinations thereof.

4. The persistent phosphor blend according to claim 1 wherein the at least one other phosphor has a general formula selected from the group consisting of $(Ca,Sr)_8(Mg,Zn)(SiO_4)_4Cl_2:Eu^{2+},Mn^{2+}$ (CASI); $(Tb,Y,Lu,La,Gd)_3(Al,Ga)_5O_{12}:Ce^{3+}$ (TAG:Ce); $Sr_4Al_{14}O_{25}:Eu^{2+}$ (SAE); $3.5MgO-0.5MgF_2—GeO_2:Mn^{4+}$ (MFG); and combinations thereof.

5. A method of producing a persistent phosphor blend with tunable colors, comprising:

blending at least one persistent phosphor with at least one other phosphor, wherein the excitation spectrum of the at least one other phosphor partially overlaps the emission spectrum of the at least one persistent phosphor; wherein the persistent phosphor comprises a composition selected from the group consisting of a) a composition having a general formula $A_{x-y-z}Al_{2-m-n-o-p}O_4:Eu_y, Dy_z, B_m, Zn_n, Co_n, Sc_p$, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula $A_{x-y-z}Al_{2-m-n-o-p}O_4:Eu_y, Nd_z, B_m, Zn_n, Co_n, Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05.

6. The method of claim 5 wherein the at least one other phosphor is selected from the group consisting of blue emitters, blue-green emitters, green emitters, yellow emitters, yellow-orange emitters, orange-red emitters, red emitters, and combinations thereof.

7. The method of claim 5 wherein the at least one other phosphor has a general formula selected from the group consisting of $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $LaPO_4:Ce^{3+},Tb^{3+}$; $CeMgAl_{11}O_{19}:Tb^{3+}$; $GdMgB_5O_{10}:Ce^{3+},Tb^{3+},Mn^{2+}$; $GdMgB_5O_{10}:Ce^{3+},Tb^{3+}$; $(Tb,Y,Lu,La,Gd)_3(Al,Ga)_5O_{12}:Ce^{3+}$; $(Ba,Sr,Ca)_5(PO_4)_3(Cl,F,OH):Eu^{2+},Mn^{2+},Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+},Mn^{2+}$; $3.5MgO-0.5MgF_2—GeO_2:Mn^{4+}$; and combinations thereof.

8. The method of claim 5, wherein the at least one other phosphor has a general formula selected from the group consisting of $(Ca,Sr)_8(Mg,Zn)(SiO_4)_4Cl_2:Eu^{2+},Mn^{2+}$ (CASI); $(Tb,Y,Lu,La,Gd)_3(Al,Ga)_5O_{12}:Ce^{3+}$ (TAG:Ce); $Sr_4Al_{14}O_{25}:Eu^{2+}$ (SAE); $3.5MgO-0.5MgF_2—GeO_2:Mn^{4+}$ (MFG); and combinations thereof.

9. An article of manufacture containing a phosphor, comprising:

a structure; and a phosphor blend integrated into the structure or applied to the structure, the phosphor blend comprising at least one persistent phosphor and at least one other phosphor, wherein the excitation spectrum of the at least one other phosphor partially overlaps the emission spectrum of the at least one persistent phosphor;

wherein the persistent phosphor comprises a composition selected from the group consisting of a) a composition having a general formula $A_{x-y-z}Al_{2-m-n-o-p}O_4:Eu_y, Dy_z, B_m, Zn_n, Co_o, Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula $A_{x-y-z}Al_{2-m-n-o-p}O_4:Eu_y, Nd_z, B_m, Zn_n, Co_o, Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05.

10. The article of manufacture of claim 9 wherein the at least one other phosphor is selected from the group consisting of blue emitters, blue-green emitters, green emitters, yellow emitters, yellow-orange emitters, orange-red emitters, red emitters, and combinations thereof.

11. The article of manufacture of claim 9 wherein the at least one other phosphor has a general formula selected from the group consisting of $(Ba,Sr,Ca)_5(PO_4)_3(Cl,F,OH):Eu^{2+}$;

$(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $LaPO_4:Ce^{3+},Tb^{3+}$; $CeMgAl_{11}O_{19}:Tb^{3+}$; $GdMgB_5O_{10}:Ce^{3+},Tb^{3+},Mn^{2+}$; $GdMgB_5O_{10}:Ce^{3+},Tb^{3+}$; $(Tb,Y,Lu,La,Gd)_3(Al,Ga)_5O_{12}:Ce^{3+}$; $(Ba,Sr,Ca)_5(PO_4)_3(Cl,F,OH):Eu^{2+},Mn^{2+},Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+},Mn^{2+}$; $3.5MgO$-$0.5MgF_2$—$GeO_2:Mn^{4+}$; and combinations thereof.

12. The article of manufacture of claim 9 wherein the at least one other phosphor has a general formula selected from the group consisting of $(Ca,Sr)_8(Mg,Zn)(SiO_4)_4Cl_2:Eu^{2+},Mn^{2+}$ (CASI); $(Tb,Y,Lu,La,Gd)_3(Al,Ga)_5O_{12}:Ce^{3+}$ (TAG:Ce); $Sr_4Al_{14}O_{25}:Eu^{2+}$ (SAE); $3.5MgO$-$0.5MgF_2$—$GeO_2:Mn^{4+}$ (MFG); and combinations thereof.

13. The article of manufacture of claim 9 wherein the structure is selected from the group consisting of safety equipment, toys, input devices, signs, emergency exit indicators, instrument panel controls, electrical switches, circuit breaker switches, furniture, communication devices, wristwatch faces, numbers on a wristwatch face, clock faces, numbers on a clock face, kitchen ware, utensils, labels, car dashboard controls, stair treads, clothing, lamps, weapon sights, and displays.

14. The article of manufacture of claim 9 wherein the phosphor blend is incorporated into the material of the structure.

15. The article of manufacture of claim 9 wherein the phosphor blend is incorporated into a paint composition applied to the structure.

16. An article of manufacture containing a phosphor, comprising:
a structure, wherein the structure is coated with
one or more first layers disposed on the structure and comprising at least one persistent phosphor, and
one or more second layers disposed over or under the one or more first layers and comprising at least one other phosphor, wherein the excitation spectrum of the one other phosphor at least partially overlaps the emission spectrum of the persistent phosphor; wherein the persistent phosphor comprises a composition selected from the group consisting of
a) a composition having a general formula $A_{x-y-z}Al_{2-m-n-o-p}O_4:Eu_y, Dy_z, B_m, Zn_n, Co_p, Sc_p$, where A is Ba, Sr, Ca, or a combination of these elements, x is between about 0.75 and 1.3, y is between about 0.0005 and about 0.1, z is between about 0.0005 and about 0.1, m is between about 0.0005 and about 0.30, n is between about 0.0005 and about 0.10, o is between about 0 and about 0.01 and p is between about 0 and about 0.05, and b) a composition having general formula $A_{x-y-z}Al_{2-m-n-o-p}O_4:Eu_y, Nd_z, B_m, Zn_n, Co_o, Sc_p$, where A is Ba, Sr, Ca, or a combination of these elements, x is between about 0.75 and about 1.3, y is between about 0.0005 and about 0.1, z is between about 0.0005 and about 0.1, m is between about 0.0005 and about 0.30, n is between about 0.0005 and about 0.10, o is between about 0 and about 0.01, and p is between about 0 and about 0.05.

17. The article of manufacture of claim 16 wherein the at least one other phosphor is selected from the group consisting of blue emitters, blue-green emitters, green emitters, yellow emitters, yellow-orange emitters, orange-red emitters, red emitters, and combinations thereof.

18. The article of manufacture of claim 16 wherein the at least one other phosphor has a general formula selected from the group consisting of $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; $Sr_4Al_{14}O_{25}:Eu^{2+}$; $BaAl_8O_{13}:Eu^{2+}$; $2SrO.0.84P_2O_5.0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$; $LaPO_4:Ce^{3+},Tb^{3+}$; $CeMgAl_{11}O_{19}:Tb^{3+}$; $GdMgB_5O_{10}:Ce^{3+},Tb^{3+},Mn^{2+}$; $GdMgB_5O_{10}:Ce^{3+},Tb^{3+}$; $(Tb,Y,Lu,La,Gd)_3(Al,Ga)_5O_{12}:Ce^{3+}$; $(Ba,Sr,Ca)_5(PO_4)_3(Cl,F,OH):Eu^{2+},Mn^{2+},Sb^{3+}$; $(Y,Gd,La,Lu,Sc)_2O_3:Eu^{3+}$; $(Y,Gd,La,In,Lu,Sc)BO_3:Eu^{3+}$; $(Y,Gd,La)(Al,Ga)O_3:Eu^{3+}$; $(Ba,Sr,Ca)(Y,Gd,La,Lu)_2O_4:Eu^{3+}$; $(Y,Gd)Al_3B_4O_{12}:Eu^{3+}$; monoclinic $Gd_2O_3:Eu^{3+}$; $(Gd,Y)_4(Al,Ga)_2O_9:Eu^{3+}$; $(Ca,Sr)(Gd,Y)_3(Ge,Si)Al_3O_9:Eu^{3+}$; $(Sr,Mg)_3(PO_4)_2:Sn^{2+}$; $GdMgB_5O_{10}:Ce^{3+},Mn^{2+}$; $3.5MgO$-$0.5MgF_2$—$GeO_2:Mn^{4+}$; and combinations thereof.

19. The article of manufacture of claim 16 wherein the at least one other phosphor has a general formula selected from the group consisting of $(Ca,Sr)_8(Mg,Zn)(SiO_4)_4Cl_2:Eu^{2+},Mn^{2+}$ (CASI); $(Tb,Y,Lu,La,Gd)_3(Al,Ga)_5O_{12}:Ce^{3+}$ (TAG:Ce); $Sr_4Al_{14}O_{25}:Eu^{2+}$ (SAE); $3.5MgO$-$0.5MgF_2$—$GeO_2:Mn^{4+}$ (MFG); and combinations thereof.

20. The article of manufacture of claim 16 wherein the structure is selected from the group consisting of safety equipment, toys, input devices, signs, emergency exit indicators, instrument panel controls, electrical switches, circuit breaker switches, furniture, communication devices, wristwatch faces, numbers on a wristwatch face, clock faces, numbers on a clock face, kitchen ware, utensils, labels, car dashboard controls, stair treads, clothing, lamps, weapon sights, and displays.

* * * * *

UNITED STATES PATENT AND TRADEMARK OFFICE
CERTIFICATE OF CORRECTION

PATENT NO.        : 8,003,012 B2                                    Page 1 of 1
APPLICATION NO.   : 12/057496
DATED             : August 23, 2011
INVENTOR(S)       : Comanzo et al.

It is certified that error appears in the above-identified patent and that said Letters Patent is hereby corrected as shown below:

In Column 6, Line 48, delete ",$Mn^{3+}$;" and insert -- , $Mn^{2+}$; --, therefor.

In Column 9, Line 43, in Claim 4, delete "(TAG:Cc);" and insert -- (TAG:Ce); --, therefor.

In Column 9, Line 54, in Claim 5, delete "$Co_n$," and insert -- $Co_o$, --, therefor.

In Column 9, Line 63, in Claim 5, delete "$Co_n$," and insert -- $Co_o$, --, therefor.

In Column 11, Line 18, in Claim 12, delete "Cc);" and insert -- Ce); --, therefor.

In Column 11, Line 48, in Claim 16, delete "$Co_p$," and insert -- $Co_o$, --, therefor.

Signed and Sealed this
Twelfth Day of June, 2012

David J. Kappos
*Director of the United States Patent and Trademark Office*